United States Patent [19]

French

[11] Patent Number: 4,479,109
[45] Date of Patent: Oct. 23, 1984

[54] TIRE DEFLATION WARNING DEVICE

[76] Inventor: Ernest French, 117 Somerville Rd., Hornsby Heights, Australia

[21] Appl. No.: 385,873

[22] Filed: Jun. 7, 1982

[30] Foreign Application Priority Data

Jun. 17, 1981 [AU] Australia .......................... PE9343/81

[51] Int. Cl.³ .............................................. B60C 23/04
[52] U.S. Cl. ...................................... 340/58; 200/61.25
[58] Field of Search ............ 340/58; 200/61.22, 61.25; 116/34 R

[56] References Cited

U.S. PATENT DOCUMENTS 3,181,118 4/1965 Perry ................................ 200/61.22
3,646,514 2/1972 Mitchell ................................ 340/58

Primary Examiner—Charles Frankfort
Assistant Examiner—Denis E. Corr
Attorney, Agent, or Firm—Stevens, Davis, Miller & Mosher

[57] ABSTRACT

A tire deflation warning device having an arm carried by the rotating wheel and normally held retracted by a plunger activated by tire air pressure. Upon deflation the plunger releases the arm to be moved radially outwardly by centrifugal force so as to contact an element on the vehicle body and sound an alarm.

2 Claims, 4 Drawing Figures

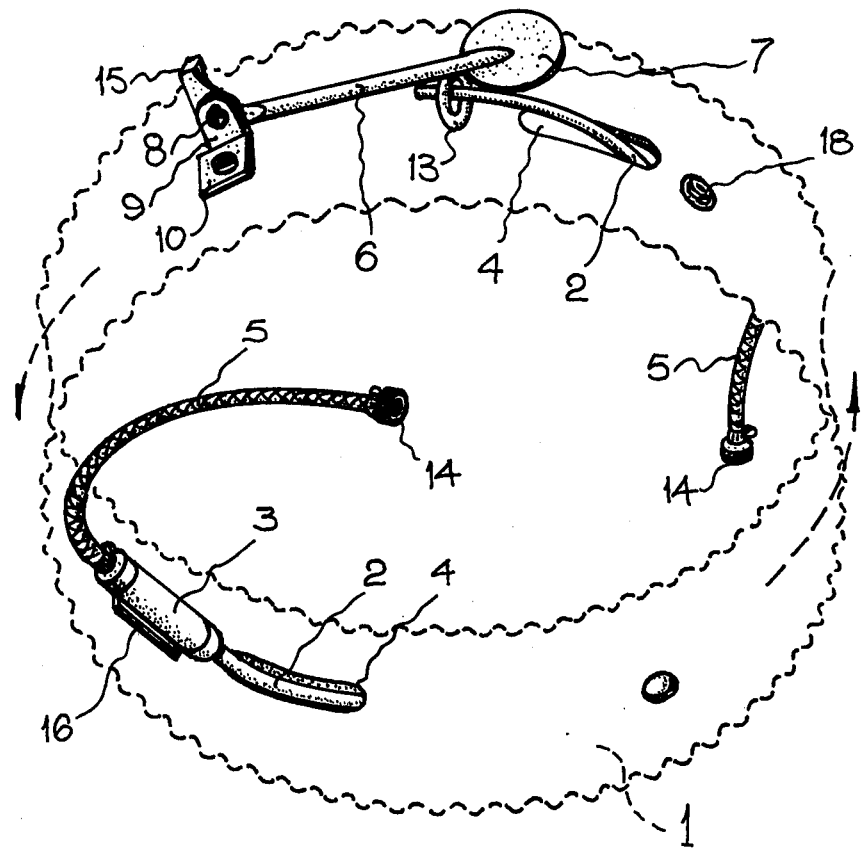
~Fig. 1~
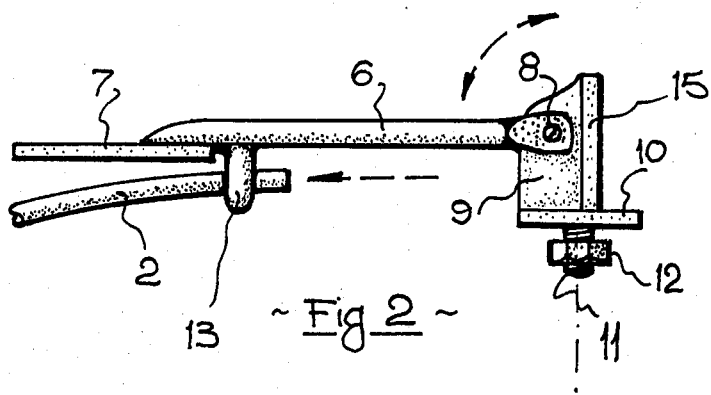
~Fig 2~

TIRE DEFLATION WARNING DEVICE

This invention relates to deflation warning devices, and more particularly to a pneumatically-operated device which warns the driver of a vehicle having dual wheels of the 'spider' kind when a tire has become deflated.

The tires of freight-carrying vehicles such as semi-trailers are very costly, while even the cost of a 'retread' is about a third of that of a new tire; thus it well behoves an owner or driver to maintain scrupulously a vehicle's tires at all times, as a set of such represents a considerable investment.

While disc wheels are still employed in dual wheel assemblies—the two deeply dished discs being fastened 'back-to-back'—the kind known as 'spider' wheels are becoming the norm, particularly on semi-trailers. These spider wheels are kept separated by means of a spacer ring, usually having corrugated edges, which rotates with the wheels.

It is a well-known fact that the driver of a dual wheeled vehicle cannot, at least under normal driving conditions, tell when one tire of a pair has lost pressure, as through being punctured, and since even the most conscientious driver will hardly visually check his tires at less than 100 mile intervals, it is all too easy to destroy a tire before noticing it to be deflated.

It is therefore an object of the present invention to overcome the above and other disadvantages by the provision of a tire deflation warning device comprising, in combination, a spring-loaded plunger arrangement and a co-operating trip arm, both being attachable to the periphery of a spacer ring of a dual wheel assembly; said spring-loaded plunger arrangement including a flexible conduit for communication with the valve of a tire of said dual wheel assembly or of an inner tube thereof; the plunger of said arrangement, when in its extended position due to said tire or tube being inflated to optimum pressure, being adapted to engage a co-acting element of said trip arm to maintain it substantially parallel to the spacer ring's periphery but which, when in its retracted position due to deflation of said tire or tube, disengages from said element to thereby permit said trip arm to swing through substantially a right angle, in response to centrifugal force, to assume a radial position in which its outer end is able to contact a contact arm to thereby cause a warning signal source to be actuated.

Preferably, the spring-loaded plunger arrangement is attachable to the underside of the spacer ring's periphery with the plunger extending through a slot in the periphery; ideally, the trip arm is pivotally attachable to the spacer ring's periphery, stop means being provided to prevent swinging movement of the trip arm beyond the radial position thereof.

Advantageously, contact between the outer end of the trip arm and the contact arm causes a visual and/or audible signal to be triggered off in the driver's cab.

In order that the reader may gain a better understanding of the present invention, hereinafter will be described a preferred embodiment thereof, by way of example only, and with reference to the accompanying drawings in which:

FIG. 1 is a perspective view showing a pair of warning devices according to the present invention, the spacer ring being shown in broken line;

FIG. 2 is a side elevation of a typical trip arm;

In the drawings, common integers are referenced by like numerals.

Figure 3:
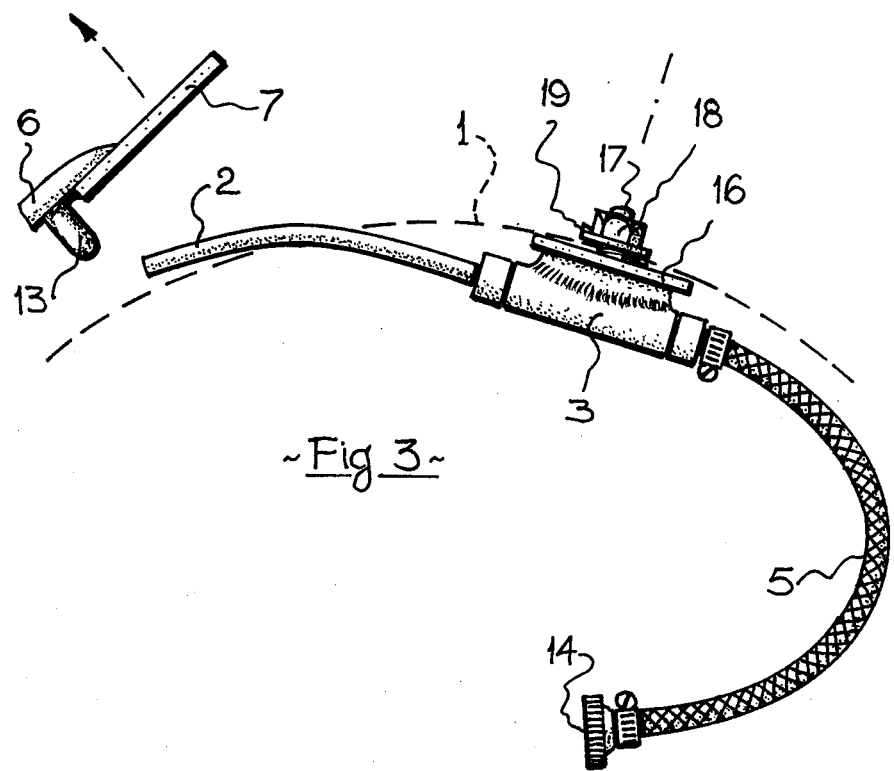
FIG. 3 is a side elevation of a typical spring-loaded plunger arrangement.

FIG. 1 illustrates a corrugated-edged spacer ring 1 to the periphery of which is attached, at diametrically opposed locations, a pair of warning devices according to the present invention. Each warning device includes a spring-loaded plunger arrangement in which a plunger 2 is longitudinally movable within a cylindrical housing 3 which is attachable (see FIG. 3) to the periphery of spacer ring 1. In this particular embodiment, housing 3 is on the underside of spacer ring 1, plunger 2 extending through a slot 4 in the periphery. A flexible conduit 5 serves to communicate the spring-loaded plunger arrangement with the valve of either the inner tube or the tire itself. Needless to say, two of the inventive devices are necessary per spacer ring to be in accord with the two tires of a dual wheel assembly.

Each warning device further includes a trip arm 6 attachable to the periphery of spacer ring 1; trip arm 6 has, at its outer end, a contact plate 7 and is pivotted at its inner end, as best to be seen in FIG. 2. The purpose of the contact plate 7 is to present a larger area for contact with the contact arm, as will be explained hereinafter.

The trip arm, shown in greater detail in FIG. 2, is pivotted at pivot point 8 to a pivot plate 9 upstanding perpendicularly from a base plate 10 which is attachable to spacer ring 1 by such means as the threaded stud 11 and nut 12. There may be a spring washer between the spacer ring and the nut. Upon the rod 6 of the trip arm is mounted a co-acting element such as the ring 13 adapted to engage with the plunger 2 of the spring-loaded plunger arrangement.

Turning now to FIG. 3, this spring-loaded plunger arrangement is to be seen in more detail. Cylindrical housing 3 has an internal helical spring which, in conventional manner, retracts plunger 2 into housing 3 under conditions of atmospheric or otherwise inadequate pressure. The flexible conduit 5 connects cylindrical housing 3 to the valve of an inner tube or tubeless tire; the knurled connector 14 having within it a pin which, in known manner, depresses the plunger of the tire or tube valve so that, when the pressure is at the optimum value, the plunger 2 is caused to be extended so that its free end can engage ring 13 to maintain the trip arm 6 substantially parallel to the periphery of spacer ring 1, as shown in FIG. 2.

However, when the pressure in tire or tube falls below a pre-determined value, plunger 2 is caused to be retracted into cylindrical housing 3 to the extent that plunger 2 disengages from ring 13 and allows trip arm 6 to pivot outwardly, in response to centrifugal force as the dual wheel assembly rotates, so that it assumes a radial position. To prevent trip arm 6 from swinging movement beyond this radial position, a stop 15 is provided contiguous with pivot plate 9 and base plate 10—see FIG. 2. Cylindrical housing 3 has a base plate 16 which is attachable to spacer ring 1 by such means as threaded stud 17 and nut 18. There may be a spring washer, such as 19, between the spacer ring and the nut.

Figure 4:
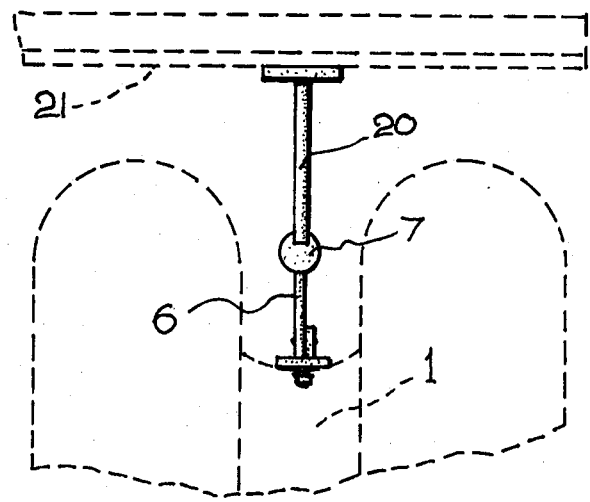
FIG. 4 shows, somewhat schematically, a radially disposed trip arm contacting a contact arm.

FIG. 4 shows, somewhat schematically, how the contact plate 7 of trip arm 6, when the latter has been swung outwardly by centrifugal force on loss of pressure in a tire, touches the tip of a contact arm 20 at each revolution; as contact plate 7 passes contact arm 20 and is 'knocked down', it is immediately restored to its operative position by centrifugal force.

Each time a trip arm contacts the contact arm 20 an audible and/or visual alarm is 'triggered off' in the cab of the vehicle, as via a microswitch and solenoid arrangement, for example, to warn the driver that at least one tire has become deflated. Advantageously, such a contact arm as 20 may be attached to the underside 21 of the tray or body, or otherwise, of the vehicle.

Since the dual rear wheels of a prime mover may be mounted via a floating-end walker beam (although the rear wheels of the trailer portion are not) the dual wheel assembly may move a few centimeters laterally when the 'rig' is cornering and so it is to this end that the contact plate 7 on trip arm 6 is made wide enough not to miss the contact arm 20 if a tire deflates when cornering. Contact arm 20 need not be rigid, and it may be expedient in some instances to construct it from resilient tubing.

Although the drawings show the spring-loaded plunger arrangement attached to the underside of the spacer ring 1, it will be realized that it may equally well be attached to the outer side of the ring, in which case the plunger will not extend through slot 4. However, in such a case the flexible conduit will pass through a suitable aperture in the spacer ring.

The circular-sectioned plunger shown in the drawings may be prevented from rotating in cylindrical housing 3 by such means as a spline-and-keyway arrangement in well-known manner but alternatively the plunger and its collar may have a rectangular cross-section, analogous to that of an extending-bar air pressure gauge.

While the drawings illustrate a pivotted trip arm fabricated from metal rod, a resilient arm may instead be used made from, say, helically-wound metallic material or even a suitable plastic material provided that the material employed possesses an adequate elastic memory; a plastic arm will require a metallic contact at its free end, or at least a contact of some electricaly-conducting substance.

From the above-going it will be readily appreciated that tire deflation warning devices constructed according to the present invention will provide the public with a new or much-improved article or, at the very least, offer to it a useful and attractive choice.

What I claim is:

1. A tire deflation warning device comprising, in combination, a spring-loaded plunger arrangement and a co-operating trip arm; said spring-loaded plunger arrangement being attachable to the underside of the periphery of a spacer ring of a dual wheel assembly and said co-operating trip arm being pivotally attachable to the outer side of the periphery of the said spacer ring; said spring-loaded plunger arrangement including a flexible conduit for communication with the valve of a tire of said dual wheel assembly or of an inner tube thereof; the plunger of said arrangement, when in its extended position due to said tire or tube being inflated to optimum pressure, being adapted to engage, through a slot in said spacer ring's periphery, a co-acting element of said trip arm to maintain it substantially parallel to the spacer ring's periphery but, when in its retracted position due to deflation of said tire or tube, disengages from said element to thereby permit said trip arm to swing through substantially a right angle, in response to centrifugal force, to assume a radial position in which its outer end is able to contact a contact element to thereby actuate a visible and/or audible signal in a cab of a vehicle to which the device is fitted, stop means being provided to prevent swinging movement of said trip arm beyond the said radial position thereof.

2. A tire deflation warning device comprising, in combination, a spring-loaded plunger arrangement and a co-operating trip arm; both being attachable to the periphery of a spacer ring of a dual wheel assembly, said trip arm being pivotally attached thereto; said spring-loaded plunger arrangement including a flexible conduit for communication with the valve of a tire of said dual wheel assembly or of an inner tube thereof; the plunger of said arrangement, when in its extended position due to said tire or tube being inflated to optimum pressure, being adapted to engage a co-acting element of said trip arm to maintain it substantially parallel to the spacer ring's periphery but, when in its retracted position, due to deflation of said tire or tube, disengages from said element to thereby permit said trip arm to swing through substantially a right angle, in response to centrifugal force, to assume a radial position in which its outer end is able to contact a contact element to thereby cause a warning signal to be actuated; stop means being provided to prevent swinging movement of said trip arm beyond the said radial position thereof.

* * * * *